United States Patent
Zheng et al.

(10) Patent No.: US 10,976,602 B2
(45) Date of Patent: Apr. 13, 2021

(54) BACKLIGHT MODULE AND DISPLAY DEVICE

(71) Applicant: Xiamen Tianma Micro-Electronics Co.,Ltd., Xiamen (CN)

(72) Inventors: Zeyuan Zheng, Xiamen (CN); Yanping Yu, Xiamen (CN); Ankai Ling, Xiamen (CN); Ting Zhou, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/662,856

(22) Filed: Oct. 24, 2019

(65) Prior Publication Data
US 2020/0166804 A1 May 28, 2020

(30) Foreign Application Priority Data
Nov. 23, 2018 (CN) .......................... 201811405250.8

(51) Int. Cl.
G02F 1/13357 (2006.01)
(52) U.S. Cl.
CPC .. *G02F 1/133605* (2013.01); *G02F 1/133603* (2013.01); *G02F 1/133608* (2013.01)
(58) Field of Classification Search
CPC ......... G02F 1/133603; G02F 1/133605; G02F 1/133608; F21V 7/041; F21V 7/048; F21V 7/0083
See application file for complete search history.

(56) References Cited

U.S. PATENT DOCUMENTS

| 5,580,156 | A  * | 12/1996 | Suzuki | ..................... B60Q 7/00 116/63 P |
| 6,318,886 | B1 * | 11/2001 | Stopa | ..................... F21V 7/0083 362/555 |
| 7,329,982 | B2 * | 2/2008 | Conner | ................... H01L 33/58 257/98 |
| 8,721,115 | B2 * | 5/2014 | Ing | ......................... G09F 13/14 362/245 |

(Continued)

FOREIGN PATENT DOCUMENTS

| CN | 201487869 U | 5/2010 |
| CN | 104566043 A | 4/2015 |
| CN | 108700773 A | 10/2018 |

*Primary Examiner* — Julie A Bannan
(74) *Attorney, Agent, or Firm* — Anova Law Group PLLC

(57) ABSTRACT

A backlight module and a display device are provided. The backlight module includes a backing plate. The backing plate includes a first surface and a second surface disposed oppositely to the first surface. First surface of the backing plate includes a first region and a second region surrounding the first region. The backlight module also includes a plurality of light sources disposed on the first surface of the backing plate and arranged in an array. The plurality of light sources includes a plurality of first light sources in the first region and a plurality of second light sources in the second region. The backlight module also includes a plurality of reflection structures. Each of the reflection structures is disposed at periphery of one second light source, and reflects light emitted by the second light source to a side of the second light source facing away from the backing plate.

17 Claims, 8 Drawing Sheets

(56) References Cited

U.S. PATENT DOCUMENTS

| | | | | |
|---|---|---|---|---|
| 9,116,387 | B2* | 8/2015 | Shimizu | G02F 1/133605 |
| 9,341,766 | B2* | 5/2016 | Shimizu | G02B 6/0091 |
| 2003/0222225 | A1* | 12/2003 | Shiraishi | B82Y 10/00 |
| | | | | 250/492.2 |
| 2008/0219003 | A1* | 9/2008 | Park | G02F 1/133603 |
| | | | | 362/247 |
| 2011/0063850 | A1* | 3/2011 | Oide | G02F 1/133603 |
| | | | | 362/296.01 |
| 2012/0287624 | A1* | 11/2012 | Harbers | F21V 7/22 |
| | | | | 362/231 |
| 2013/0128128 | A1* | 5/2013 | Ikuta | F21V 7/0066 |
| | | | | 348/790 |
| 2013/0148036 | A1* | 6/2013 | Shimizu | H04N 5/64 |
| | | | | 348/739 |
| 2014/0092584 | A1* | 4/2014 | Ono | H01L 33/58 |
| | | | | 362/97.1 |
| 2015/0023054 | A1* | 1/2015 | Goda | B32B 7/12 |
| | | | | 362/607 |
| 2015/0377453 | A1* | 12/2015 | Ji | F21S 41/24 |
| | | | | 362/607 |
| 2017/0002992 | A1* | 1/2017 | Lee | F21S 43/33 |
| 2018/0101061 | A1* | 4/2018 | Fan | G02F 1/133608 |
| 2019/0049793 | A1* | 2/2019 | Teragawa | G02F 1/133605 |
| 2019/0063723 | A1* | 2/2019 | Yamada | H01L 33/50 |
| 2019/0107755 | A1* | 4/2019 | Chen | G02F 1/133617 |

* cited by examiner

32

32

BACKLIGHT MODULE AND DISPLAY DEVICE

CROSS-REFERENCES TO RELATED APPLICATIONS

This application claims priority of Chinese Patent Application No. 201811405250.8, filed on Nov. 23, 2018 the entire content of which is hereby incorporated by reference.

FIELD OF THE INVENTION

The present disclosure generally relates to the field of display technology and, more particularly, relates to a backlight module and a display device.

BACKGROUND

With continuous development of liquid crystal display technology, liquid crystal display modules have been widely used in liquid crystal display devices such as mobile phones and tablet computers. However, a liquid crystal display panel in a liquid crystal display device does not have a light emitting function by itself. Accordingly, a backlight module may need to be provided under a liquid crystal display panel to provide required light sources, and thus to achieve a display effect.

In terms of technology trends, how to reduce power consumption of a backlight has been most concerned. Because a backlight may be a largest energy consumer, if power consumption of a backlight is reduced, power consumption of a whole machine may be reduced greatly. Techniques for reducing power consumption of a backlight may include improving backlight drive circuits, improving luminous efficiency of a light-emitting diode (LED), and developing new LED types.

Currently, local dimming uses a backlight composed of hundreds of LEDs instead of a cold cathode fluorescent lamp (CCFL) backlight. The LEDs in a backlight may be adjusted according to brightness of an image. Brightness of a highlighted portion of a display image may be maximized, while brightness of a dark portion may be reduced or even turned off to achieve an optimum contrast. In this way, reduction in brightness of the dark portion may reduce power consumption of the backlight. Particularly, direct-lit LED backlight with a local dimming technology may greatly reduce power consumption, improve contrast values and gray levels of displayed images, and reduce residual images.

With existing high data rate (HDR) technology combined with local dimming surface backlight for regional brightness control, brightness and chromaticity close to real human vision may be achieved. However, in a conventional display device, a bluing phenomenon may occur at an edge of the display device during a display, resulting in nonuniform display brightness of the display device.

The disclosed methods and structures are directed to solve one or more problems set forth above and other problems in the art.

SUMMARY

One aspect of the present disclosure includes a backlight module. The backlight module includes a backing plate. The backing plate includes a first surface and a second surface disposed oppositely to the first surface. First surface of the backing plate includes a first region and a second region surrounding the first region. The backlight module also includes a plurality of light sources disposed on the first surface of the backing plate and arranged in an array. The plurality of light sources includes a plurality of first light sources located in the first region and a plurality of second light sources located in the second region. The backlight module also includes a plurality of reflection structures. Each of the reflection structures is disposed at periphery of one of the second light sources, and reflects light emitted by the one of the second light sources to a side of the one of the second light sources facing away from the backing plate.

Another aspect of the present disclosure includes a display device. The display device includes a liquid crystal display panel and a backlight module on the back of the liquid crystal display panel. The backing plate includes a first surface and a second surface disposed oppositely to the first surface. First surface of the backing plate includes a first region and a second region surrounding the first region. The backlight module also includes a plurality of light sources disposed on the first surface of the backing plate and arranged in an array. The plurality of light sources includes a plurality of first light sources located in the first region and a plurality of second light sources located in the second region. The backlight module also includes a plurality of reflection structures. Each of the reflection structures is disposed at periphery of one of the second light sources, and reflects light emitted by the one of the second light sources to a side of the one of the second light sources facing away from the backing plate.

Other aspects of the present disclosure can be understood by those skilled in the art in light of the description, the claims, and the drawings of the present disclosure.

BRIEF DESCRIPTION OF THE DRAWINGS

To illustrate technical solutions of the present disclosure more clearly, accompanying drawings to be used in the description of the disclosed embodiments are briefly described hereinafter. Obviously, the drawings described below are merely examples for illustrative purposes according to various disclosed embodiments and are not intended to limit the scope of the present disclosure. Other drawings may be derived from the drawings described below by a person having ordinary skill in the art without creative labor.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the present invention, which are illustrated in the accompanying drawings. Wherever possible, the same reference numbers will be used throughout the drawings to refer to the same or like parts.

Relational terms, such as "first" and "second", are used merely to distinguish one entity or operation from another entity or operation, without necessarily requiring or implying that there is any such actual relationship or order between these entities or operations. Further, terms "include", "comprise" or any variants of these terms are intended to indicate a non-exclusive inclusion. An item or equipment including a plurality of elements may include not only the plurality of elements, but also other elements not specifically listed. The item or equipment may also include elements that are inherent to the item or equipment. Without further limitations, an element listed after phrase "comprising a . . . " does not exclude that an item or equipment including the element may include additional elements, identical to the element.

Figure 1:
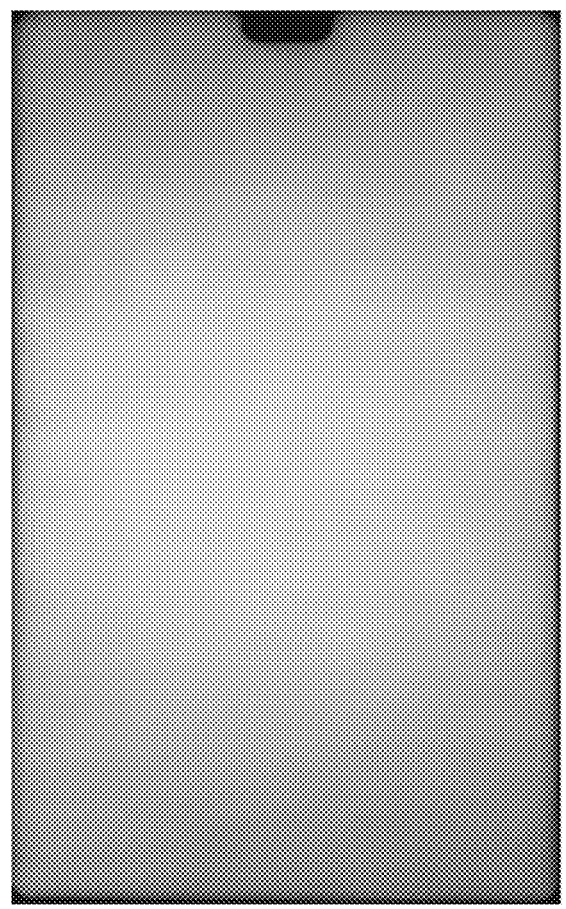
FIG. 1 illustrates a bluing phenomenon at an edge of a display device.

In a conventional display device, a bluing phenomenon may occur at an edge of the display device during a display, resulting in nonuniform display brightness of the display device. FIG. 1 illustrates a bluing phenomenon at an edge of a conventional display device. A dark color may indicate a severe bluing phenomenon. As shown in FIG. 1, brightness at an edge region and brightness at a central region are different, indicating a nonuniform display.

Figure 2:
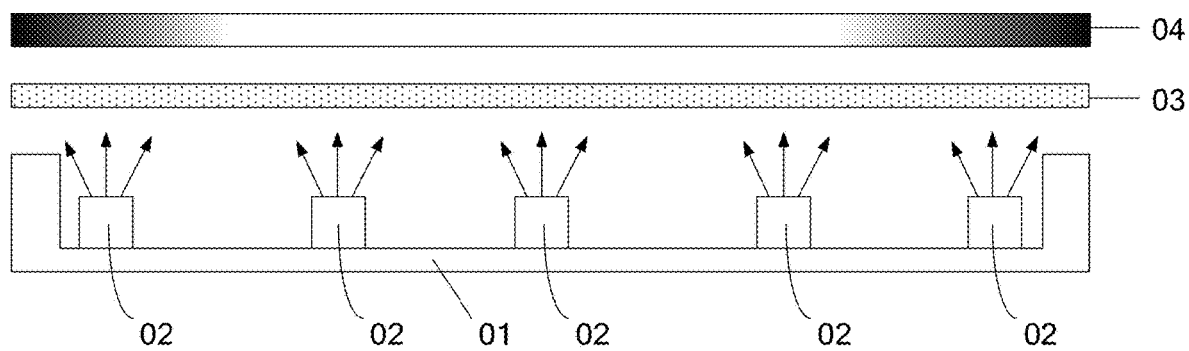
FIG. 2 illustrates a cross-sectional structural view of a display device.

A reason for a bluing phenomenon is described below. FIG. 2 illustrates a cross-sectional structural view of a conventional display device. As shown in FIG. 2, a backlight module for a high dynamic range (HDR) technology may include a backing plate 01, and a plurality of light-emitting diode (LED) light sources 02 arranged in an array on one surface of the backing plate 01. The plurality of LED light sources 02 are generally blue LEDs. By providing a fluorescent film 03 on the blue LEDs, the blue LEDs may emit red light and green light, and thus a white light backlight source may be formed. Finally, after passing through the display panel 04, an image may be formed on a display region of the display panel 04. However, since positions of the LED light sources in a central region and positions of the LED light sources at an edge region are different, a luminous flux at an edge region may be much less than a luminous flux at a central region, and thus the bluing phenonium may occur at an edge of a display region.

Specifically, periphery of a LED light source at the central region is all disposed with LED light sources. In a display state, brightness or luminous flux at the central region is a superposition effect of brightness or luminous flux of a plurality of LED light sources. For LED light sources at an edge region, by taking an LED light source at an outmost edge as an example, LED light sources are disposed at one side of the LED light source, and a portion of a plastic frame or a backing plate is at the other side, instead of LED light sources. Accordingly, brightness at the edge region may be smaller than brightness at the central region, resulting in a bluing phenomenon at the edge region.

The present disclosure provides a backlight module. The backlight module includes a backing plate. The backing plate includes a first surface and an oppositely disposed second surface. The first surface of the backing plate includes a first region and a second region surrounding the first region. That is, the first region is a central region, and the second region is a central region. The backlight module also includes a plurality of light sources disposed on the first surface of the backing plate and arranged in an array. The plurality of light sources includes a plurality of first light sources located in the first region and a plurality of second light sources located in the second region. Periphery of one second light source is disposed with a reflection structure. The reflection structure reflects light emitted by the second light source to a side of the second light source facing away from the backing plate.

Since the reflection structure is disposed at the periphery of the second light source at the edge region, the light emitted by the second light source may be reflected to the side of the second light source facing away from the back plate. That is, the light emitted by the second light source may be redistributed, and the luminous flux in a direction away from the backing plate may increase due to the reflection structure. Accordingly, the brightness at the edge may increase, thus achieving an effect consistent with the superimposition effect of the plurality of first light sources. As such, the bluing phenomenon at an edge may be avoided, making images displayed on the display device more uniform.

Figure 3:
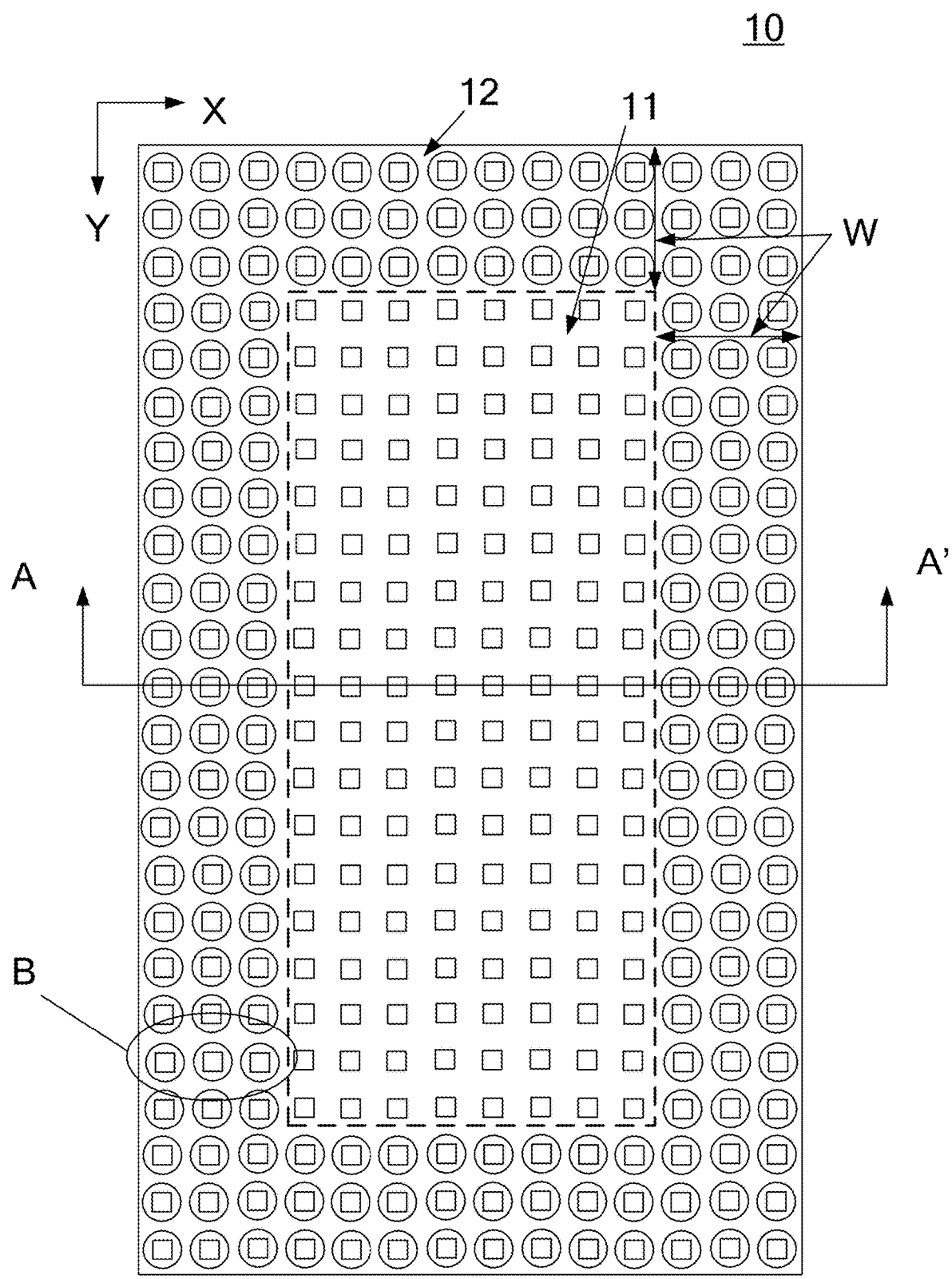
FIG. 3 illustrates a cross-sectional structural view of an exemplary backlight module consistent with the disclosed embodiments of the present disclosure.
Figure 4:
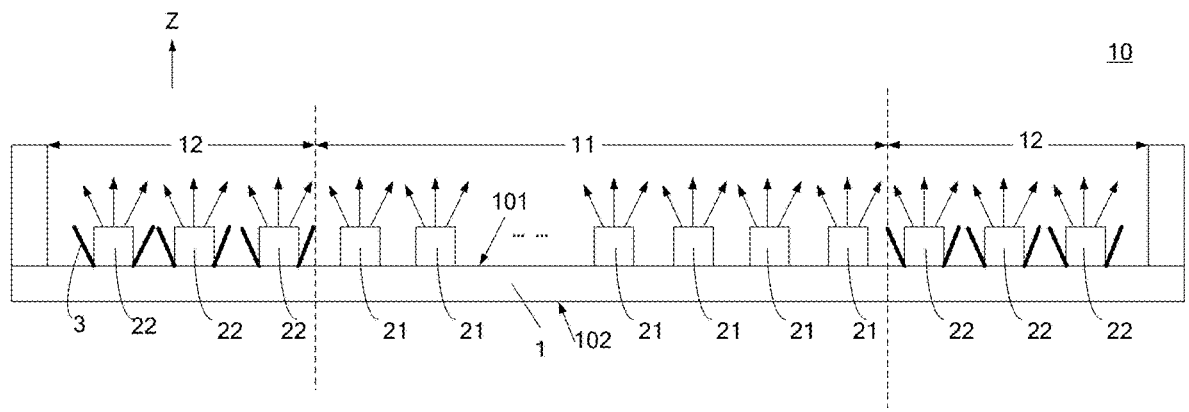
FIG. 4 illustrates a cross-sectional structural view along line AA' in FIG. 3, consistent with the disclosed embodiments of the present disclosure.

FIG. 3 illustrates a cross-sectional structural view of an exemplary backlight module consistent with the disclosed embodiments, and FIG. 4 illustrates a cross-sectional structural view along line AA' in FIG. 3.

As shown in FIG. 3 and FIG. 4, the backlight module includes a backing plate 1. The backing plate 1 includes a first surface 101 and an oppositely disposed second surface 102. The first surface 101 of the backing plate 1 includes a first region 11 and a second region 12 surrounding the first region. The backlight module 1 also includes a plurality of light sources 2 disposed on the first surface 101 of the backing plate 1 and arranged in an array. The plurality of light sources 2 includes a plurality of first light sources 21 located at the first region 101 and a plurality of second light sources 22 located at the second region 102. A reflection structure is disposed at periphery of one second light source 22. The reflection structure reflects light emitted by the second light source 22 to a side of the second light source facing away from the backing plate.

The present disclosure does not limit sizes of the first region and the second region. Since display devices may be different sizes, numbers of LEDs in corresponding backlight modules may be different. In one embodiment, a maximum length and a maximum width of one LED light source are approximately 0.5 mm, and a maximum distance between two adjacent LED light sources is approximately 1.5 mm. With accuracy controlled within approximately 1 mm, a width of the second region 12, in a direction from the first region 11 to the second region 12, of a display device of HDR display technology may be calculated to be in a range of approximately 1 mm-5 mm, including endpoint values. In one embodiment, sizes of the light sources are not limited, and the light sources may be Mini Light-Emitting Diode (Mini LED) lights. A Mini LED refers to an LED with a crystalline grain size of approximately 100 micrometers or more.

Since a display panel generally has a rectangular shape, the second region 12 may have a hollow square shape. A width W of the second region 12 is labelled in FIG. 3. As shown in FIG. 3, since the second region 12 surrounds the first region 11, the width W of the second region 12 may include a width W in an X direction and a width W in a Y direction.

The present disclosure does not limit shapes and materials of the reflection structure. In one embodiment, for ease of fabrication, the reflection structure includes an inclined reflection surface having an angle with the first surface of the backing plate. As shown in FIG. 4, the reflection structure 3 forms a lamp cover structure, covering the periphery of the second light source 22. The reflection structure 3 may thus concentrate the light emitted by the second light source 22 and reflect the light emitted by the second light source 22 to a direction away from the backing plate 1, that is, a Z direction in FIG. 4.

It should be noted that the inclined reflection surface may be a flat surface or a curved surface. Further, the inclined reflection surface may be a continuous structure or a discontinuous structure provided that the light emitted by the second light source 22 may be reflected to the Z direction.

Figure 5:
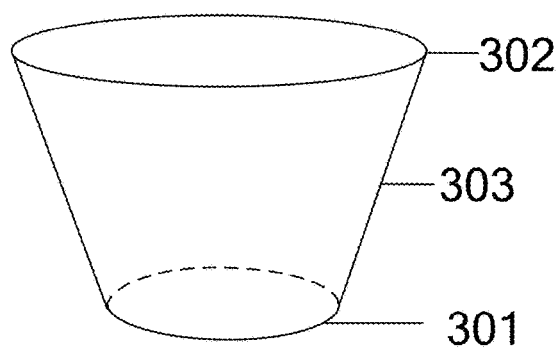
FIG. 5 illustrates an exemplary reflection structure consistent with the disclosed embodiments of the present disclosure.
Figure 6:
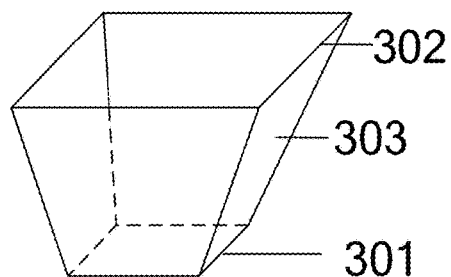
FIG. 6 illustrates another exemplary reflection structure consistent with the disclosed embodiments of the present disclosure.

FIG. 5 illustrates an exemplary reflection structure consistent with the disclosed embodiments, and FIG. 6 illustrates another exemplary reflection structure consistent with the disclosed embodiments. As shown in FIGS. 5 and 6, the inclined reflection surface has a tubular structure 31 continuously disposed around the periphery of the second light source. The tubular structure 31 includes a first end 301 and a second end 302 opposite to the first end 301, and a sidewall 303 connecting the first end 301 and the second end 302. The first end 301 of the tubular structure 31 is located on the first surface of the backing plate, and the second end 302 is located at a side of the backing plate where the plurality of light sources is disposed. An orthographic projection of the first end 301 on the backing plate is within an orthographic projection of the second end on the backing plate.

Since the orthographic projection of the first end 301 on the backing plate is within the orthographic projection of the second end 302 on the backing plate, an area enclosed by the first end 301 is smaller than an area enclosed by the second end 302. That is, opening at the first end is smaller than opening at the second end. As such, lateral light emitted by the second light source may be concentrated effectively, and the light reflected by the reflection structure may be distributed over a large area. Accordingly, mixing the light of the second light source with the light of other light sources may not be affected, avoiding a phenomenon of high local brightness.

In one embodiment, a shape of the inclined reflection surface is not limited. A shape enclosed by the first end on the first surface may be same as a shape enclosed by the second end at a plane parallel to the first surface. In some other embodiments, the shape enclosed by the first end on the first surface and the shape enclosed by the second end at a plane parallel to the first surface may be different, provided that a purpose of reflecting light may be achieved. In one embodiment, the shape enclosed by the first end on the first surface is selected to be same as the shape enclosed by the second end on a plane parallel to the first surface. The shape enclosed by the first end 301 on the first surface and the shape enclosed by the second end on a plane parallel to the first surface may be circular as shown in FIG. 5, or may be polygonal, as shown in FIG. 6.

It should be noted that when the shape enclosed by the first end 301 on the first surface and the shape enclosed by the second end 302 on a plane parallel to the first surface are circular, the inclined reflection surface may form a sidewall of a truncated cone. Since the sidewall of a truncated cone has symmetry, and the inclined reflection surface is smooth, the light emitted by the second light source and reflected by the sidewall of the truncated cone may be uniform. Also, the light emitted by the second light source may be prevented from illuminating a corner of the reflection surface, thus avoiding a problem high local brightness.

The present disclosure does not limit whether the inclined reflection surfaces around the second light sources have a same shape. In one embodiment, all tubular structures have a same shape and size. Compared to a conventional technology, this configuration may improve the bluing phenomenon at an edge.

In some other embodiments, the tubular structures may have different shapes depending on where the second sources are located. A partially enlarged view of an exemplary cross-sectional structure of region B in FIG. 3 is described below.

Figure 7:
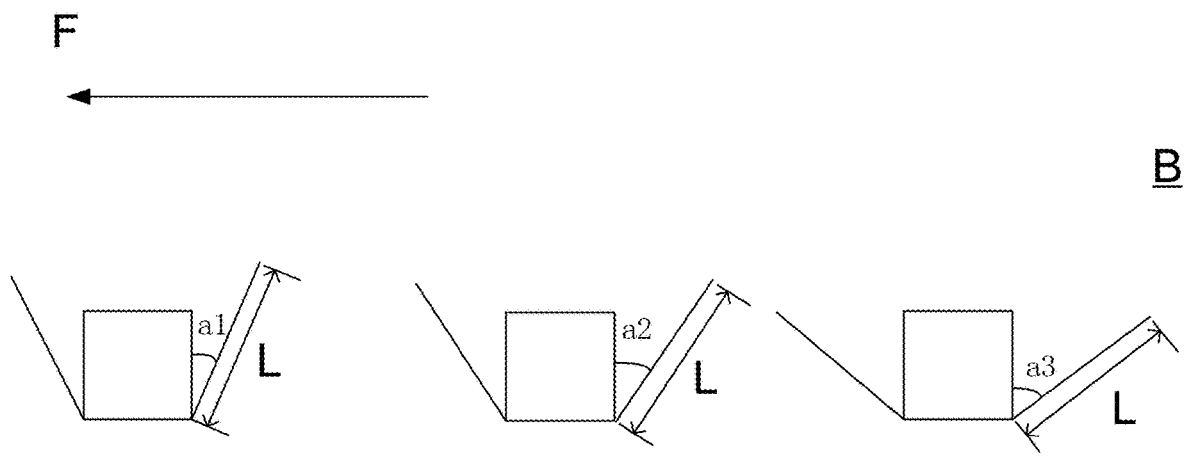
FIG. 7 illustrates a partially enlarged view of an exemplary cross-sectional structure of region B in FIG. 3, consistent with the disclosed embodiments of the present disclosure.

FIG. 7 illustrates a partially enlarged view of an exemplary cross-sectional structure of region B in FIG. 3. As shown in FIG. 7, the first ends of all the tubular structures enclose a same area on the first surface, and all the tubular structures have a same sidewall length L in a plane perpendicular to the first surface. In direction F from the first light sources to the second light sources, areas enclosed by the second ends of the tubular structures in a plane parallel to the first surface gradually decrease. As shown in FIG. 7, in the direction F, openings of the second ends of the tubular structures become smaller gradually. That is, luminous flux may be changed by adjusting an inclination angle of the sidewall of the tubular structure.

Figure 8:
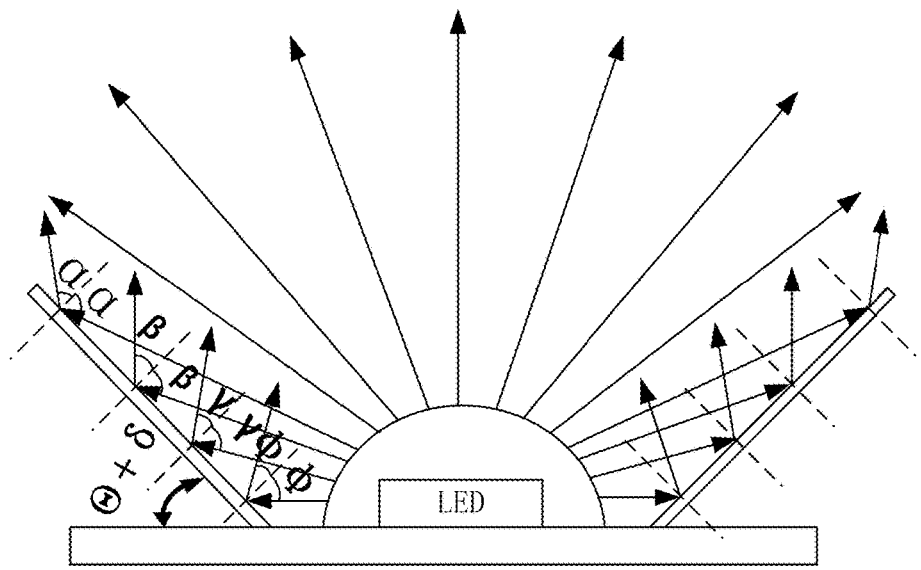
FIG. 8 illustrates a light reflection effect diagram with an angle ($\theta+\delta$) between a sidewall of a tubular structure and a backing plate, consistent with the disclosed embodiments of the present disclosure.
Figure 9:
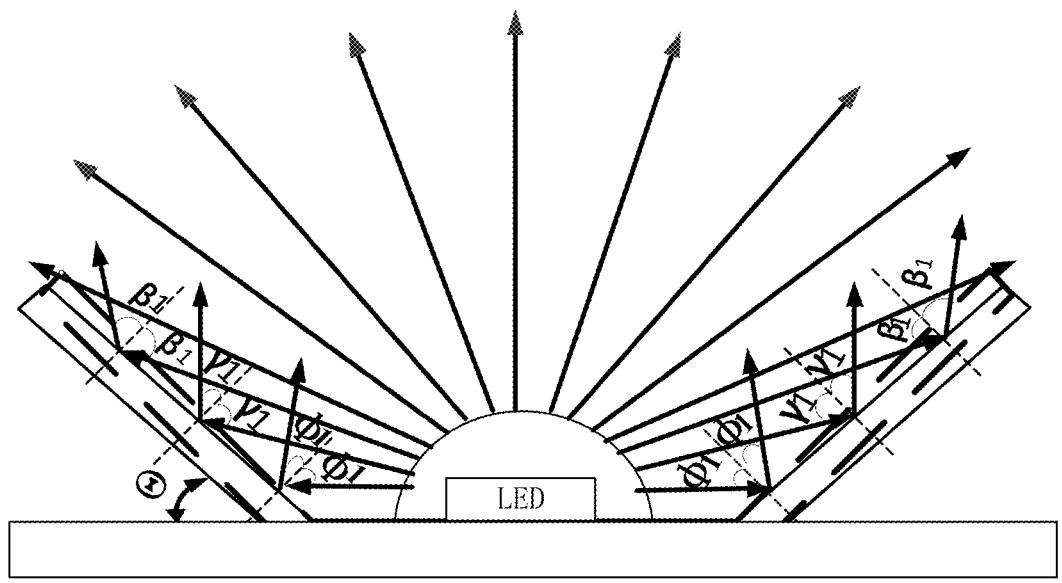
FIG. 9 illustrates a light reflection effect diagram with an angle θ between a sidewall of a tubular structure and a backing plate, consistent with the disclosed embodiments of the present disclosure.

FIG. 8 illustrates a light reflection effect diagram with an angle $(\theta+\delta)$ between a sidewall of a tubular structure and a backing plate. FIG. 9 illustrates a light reflection effect diagram with an angle $\theta$ between a sidewall of the tubular structure and a backing plate. As shown in FIG. 8, when the angle between the sidewall of the tubular structure and the first surface of the backing plate is θ+δ (<90°), there are 10 light paths (for each of both sides) reflected by the sidewall of the tubular structure. These light paths are concentrated directly above the LED at different levels, increasing the luminous flux at a location of the LED light source. As shown in FIG. 9, when the angle between the sidewall of the tubular structure and the backing plate is θ, number of light paths reflected by the tubular structure may be slightly reduced, and some of the light paths directly illuminate all around, reducing the luminous flux at the position of the LED light source. That is, as the angle between the tubular structure and the first surface of the backing plate decreases, the luminous flux emitted by the LED light source may decrease.

As shown in FIG. 7, angles between a sidewall of the tubular structure and the backing plate for three tubular structures arranged in the F direction are a1, a2 and a3 respectively, where a3>a2>a1. That is, in a direction from the first region toward the second region, specifically, in a direction from the central region toward the edge region, the sidewalls of the tubular structures become further away from the first surface of the backing plate. Accordingly, a second light source closer to the edge may have a larger luminous flux, and thus the brightness of the region where the second light source is located may be increased.

As shown in FIG. 3, in the edge region, each layer includes two columns and two rows. There are differences between the second light sources at an outermost layer, the second light sources at a secondary outermost layer, and the second light sources at the edge region adjacent to the first light sources. For example, one side of the second light sources at the outermost layer is a frame or a frame glue, and there are no other second light sources at this side. At one side, facing the frame, of the second light sources at the secondary outmost layer, a layer of second light sources, that is, the second light sources at the outermost layer, are disposed adjacent to the second outmost layer. A plurality of layers of the second light sources or the first light sources are disposed around the second light sources adjacent to the first light sources. That is, in the edge region, a position closer to the edge may have a smaller density of the light sources. Specifically, along a direction from the center region to the edge region, number of light sources disposed in a same area gradually decreases.

Accordingly, in the backlight module provided by the present disclosure, lateral light of the second light sources may be reflected by the reflection structure and emitted away from the backing plate. For a second light source closer to the edge, the luminous flux of the light emitted away from the backing plate may be larger. That is, in the direction from the central region to the edge, the illuminating brightness of the second light sources in the edge region may change gradually. Accordingly, superimposition effects of the second light sources at different locations at the edge region may be consistent, thereby avoiding the bluing phenomenon that the edge region.

Figure 10:
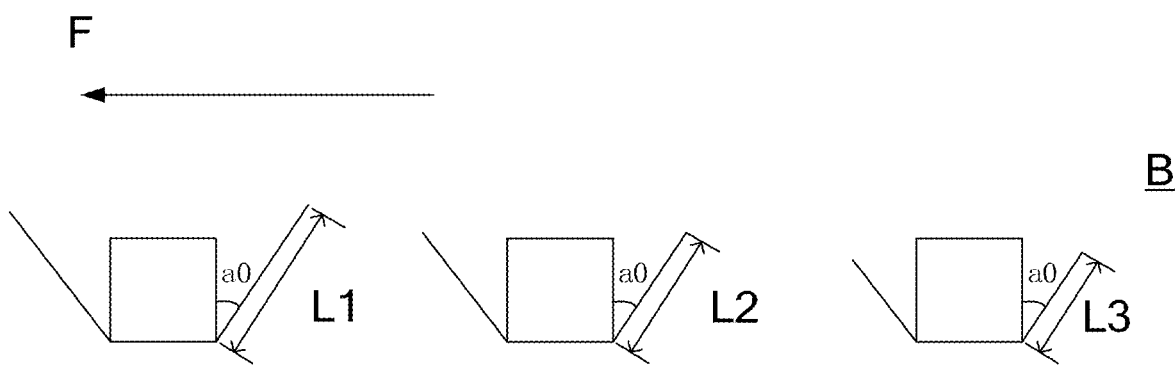
FIG. 10 illustrates a partially enlarged view of another exemplary cross-sectional structure of region B in FIG. 3, consistent with the disclosed embodiments of the present disclosure.

FIG. 10 illustrates a partially enlarged view of another exemplary cross-sectional structure of region B in FIG. 3. As shown in FIG. 10, in one embodiment, the first ends of all the tubular structures enclose a same area on the first surface, and in a plane perpendicular to the first surface, the sidewalls of all the tubular structures have a same angle a0 with the first surface. In the direction from the first light sources to the second light sources, the lengths of the tubular structures in a plane perpendicular to the first surface gradually increases. As shown in FIG. 10, in the direction F, i.e., the direction from the first light sources to the second light sources, the lengths of the tubular structures in the plane perpendicular to the first surface are L3, L2 and L1 respectively, where L1>L2>L3. It may be understood that a tubular structure has a larger sidewall length may have a larger reflection area, and thus the corresponding second light source may have a larger luminous flux. That is, a second light source closer to the edge may have a tubular structure with a longer sidewall length, and thus have a larger luminous flux. Accordingly, light brightness at a region where the second light source is located may be improved.

In some other embodiments, the inclined reflection surfaces may be discontinuous. For example, one inclined reflection surface may include a plurality of separated sub-reflection surfaces, and the plurality of sub-reflection surfaces are evenly distributed around a second light source, and have a same angle with the first surface of the backing plate.

Figure 11:
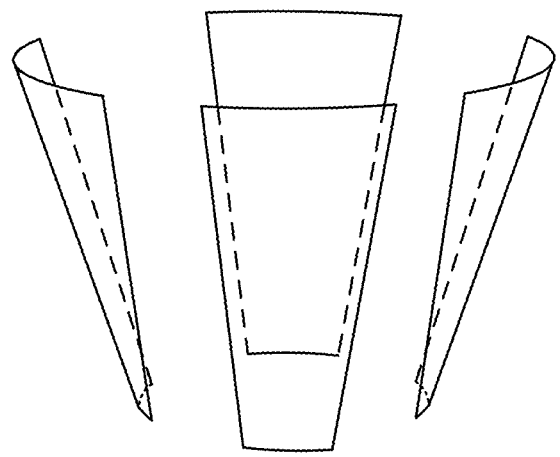
FIG. 11 illustrates another exemplary reflection structure consistent with the disclosed embodiments of the present disclosure.
Figure 12:
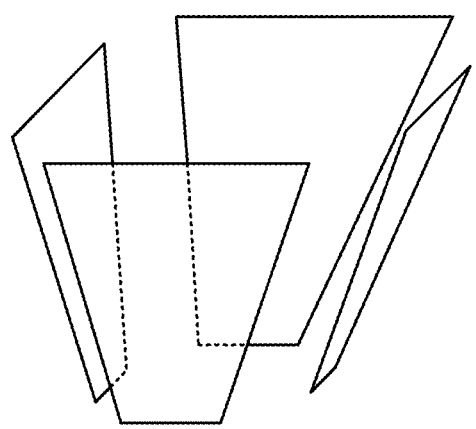
FIG. 12 illustrates another exemplary reflection structure consistent with the disclosed embodiments of the present disclosure.

FIG. 11 illustrates another exemplary reflection structure, and FIG. 12 illustrates another exemplary reflection structure. As shown in FIGS. 11 and 12, the plurality of sub-reflection surfaces may form a petal-like structure. In FIG. 11, the sub-reflection surfaces are curved surfaces, and the plurality of separated sub-reflection surfaces around a second light source form a portion of a sidewall of a truncated cone. In FIG. 12, a shape of the sub-reflection surfaces is an isosceles trapezoid. The upper base of the isosceles trapezoid is located at the first surface of the backing plate, and the lower base of the isosceles trapezoid is located at the side of the backing plate where the plurality of light sources is disposed. In some other embodiments, the plurality of sub-reflection surfaces may have different shapes, or may have different angles with the first surface of the backing plate.

In one embodiment, all the sub-reflection surfaces have a same shape and size, and have a same angle with the first surface of the backing plate. Accordingly, the reflection structure may be easily constructed, and reflection of the light emitted by the second light source may be easily controlled.

Figure 13:
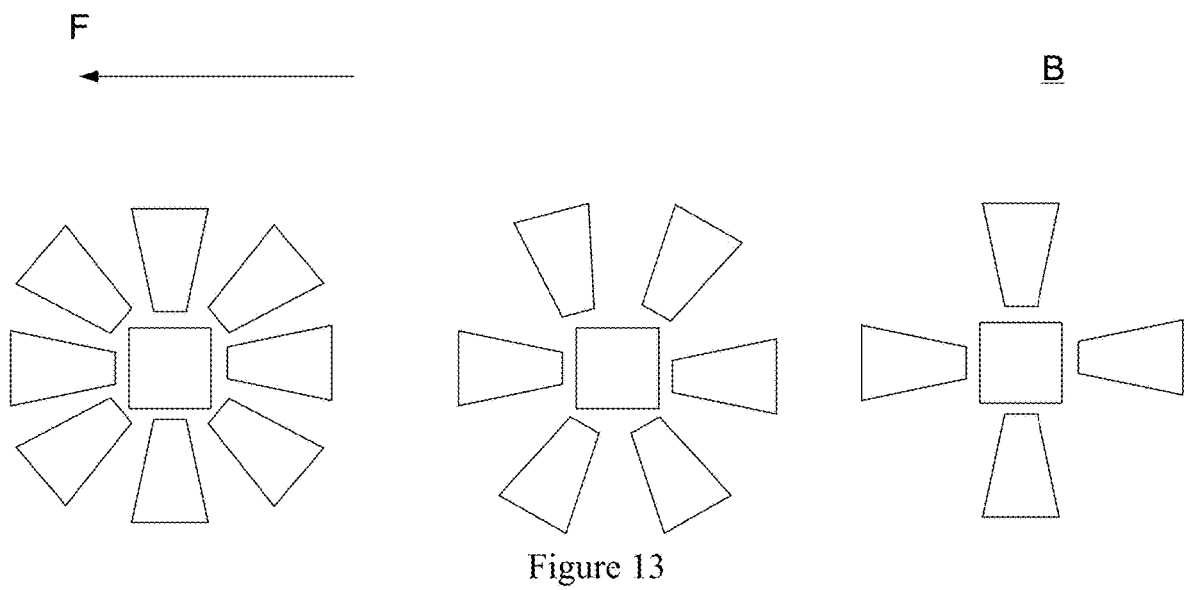
FIG. 13 illustrates a partially enlarged view of another exemplary cross-sectional structure of region B in FIG. 3, consistent with the disclosed embodiments of the present disclosure.

FIG. 13 illustrates a partially enlarged view of another exemplary cross-sectional structure of region B in FIG. 3. To address an issue that the brightness of the second light sources are the edge region may be relatively small, along the direction F from the first light sources to the second light sources, number of sub-reflection surfaces disposed around one second light source gradually increases, as shown in FIG. 13.

Figure 14:
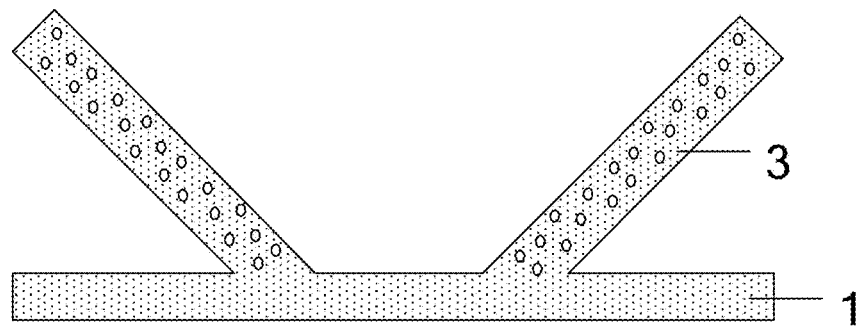
FIG. 14 illustrates a cross-sectional structural view of an exemplary structure consisting of a reflection structure and a backing plate integrally formed by injection molding, consistent with the disclosed embodiments of the present disclosure.

It should be noted that the present disclosure does not limit a formation process of the reflection structures. The reflection structures may be disposed independently of the backing plate or may be formed simultaneously with the backing plate. Specifically, the reflection structure may be a white reflection structure, and a reflection principle is that a reflection effect may be achieved by injecting a certain amount of BaSO4 particles into polyethylene terephthalate (PET). The reflection structure of may be integrally formed together with a PET backing plate simultaneously, and then BaSO4 particles are injected into a portion for the reflection structure. FIG. 14 illustrates a cross-sectional structural view of an exemplary structure consisting of a reflection structure and a backing plate integrally formed by injection molding.

Figure 15:
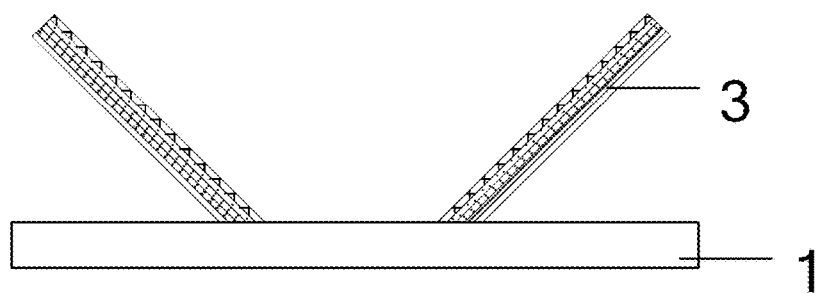
FIG. 15 illustrates a cross-sectional structural view of an exemplary reflection structure independent of a backing plate, consistent with the disclosed embodiments of the present disclosure.

In some other embodiments, the reflection structure may also be disposed independently of the backing plate. The specific reflection structure may be a silver reflection structure, and the reflection principle is that a reflection effect may be achieved by compressing more than approximately 600 reflection layers. When the reflection structure is independent of the backing plate, the reflection structure may be connected to the backing plate by a bonding or damascene process. In one embodiment, the damascene process is similar to forming tenon and mortise structures, and the reflection structure may be directly fixed on the backing plate. FIG. 15 illustrates a cross-sectional view of an exemplary reflection structure independent of the backing plate.

The present disclosure does not limit methods for forming the reflection structure. If the reflection structure is independent of the backing plate, different numbers or positions of reflection structures may be set according to requirements. An integrated molding method may be more convenient for production of structures consisting of a backing plate and reflection structures.

The backlight module provided by the present disclosure includes a backing plate and a plurality of light sources at one surface of the backing plate. The plurality of light sources includes a plurality of first light sources located in a central region of the backing plate and a plurality of second light sources located in an edge region of the backing plate. A reflection structure is disposed at periphery of one second light source. The reflection structure may reflect light emitted by the second light source to a side of the second light source facing away from the backing plate. That is, the reflection structure may reflect the light emitted by the second light source that is not in a direction away from the backing plate into a direction away from the backing plate, and a luminous flux of the second light source may be increased. Accordingly, the difference may be small between the luminous flux emitted from the second light source to a direction away from the backing plate and the luminous flux in a direction away from the backing plate at the region where the first light sources are located. Consequently, consistency of the luminous flux may be achieved, avoiding the bluing phenomenon that the edge of the display device. With the method provided in the present disclosure, the brightness at edges of the display device may be increased without increasing the number of LED lights sources in the edge region of the backing plate. Thereby, images displayed on the display panel may be more uniform, and the bluing problem at edges of a display device with HDR technology may be effectively improved.

Figure 16:
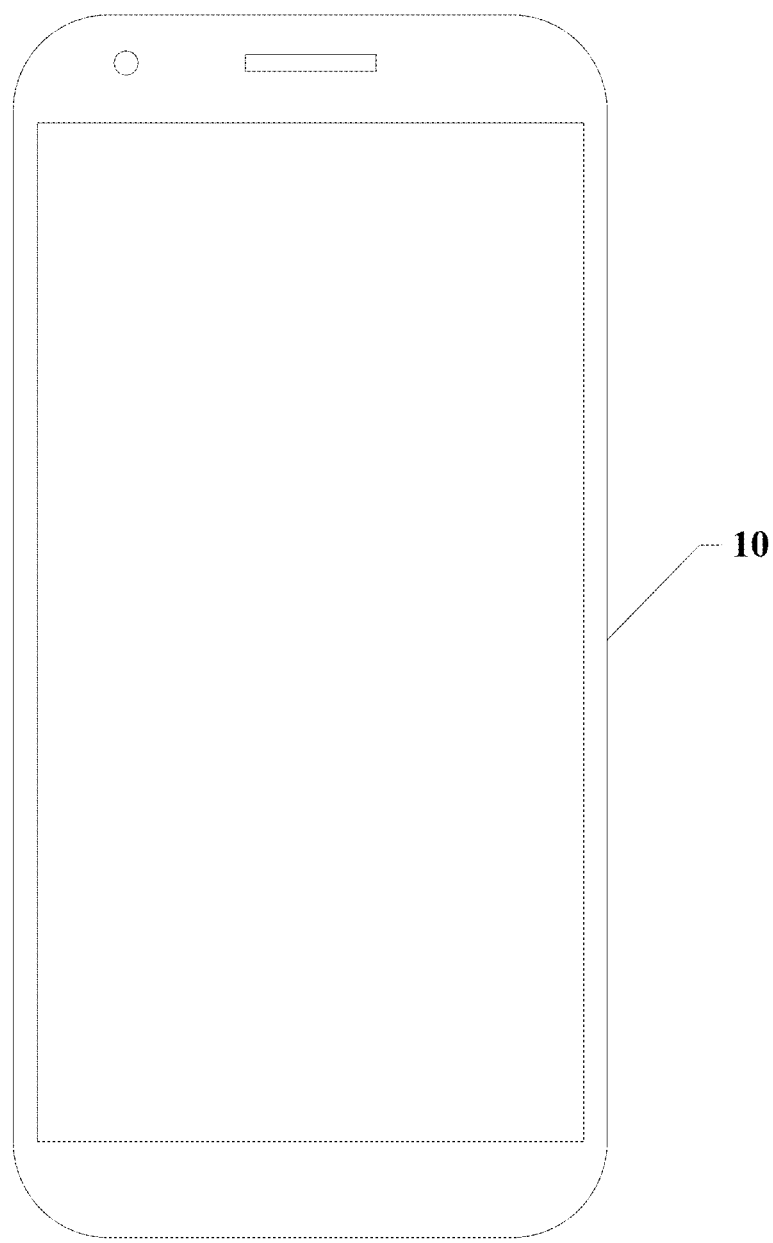
FIG. 16 illustrates an exemplary display device consistent with the disclosed embodiments of the present disclosure.

The present disclosure also provides a display device. FIG. 16 illustrates an exemplary display device consistent with the disclosed embodiments. As shown in FIG. 16, the display device 20 includes a liquid crystal display panel and a backlight module 10 on the back of the liquid crystal display panel. The backlight module 10 may be any one of the backlight modules provided in the above embodiments of the present disclosure. For embodiments of the display device 20 of the present disclosure, reference may be made to the embodiments of the backlight modules 10 described above, and the details are not described herein again.

As disclosed, the technical solutions of the present disclosure have the following advantages.

In the backlight module and the display device provided by the present disclosure, a reflection structure is disposed around a light source at an edge region of a backing plate. Light emitted from the light source located at the edge of the backing plate is reflected by the reflection structure to a side of the light source facing away from the backing plate. That is, the light is concentrated and emitted in a direction perpendicular to the backing plate, and regional control of the backlight module may thus be realized. Accordingly, possibility that the light emitted by the light source in the edge region of the backing plate may diffuse all around may be reduced, and luminous flux at the edge region of the display device may be increased. Thus, the bluing phenomenon at the edges of the display device may be improved, display brightness of the display device may be more uniform, and display effect of the display device may thus be improved.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A backlight module, comprising:
a backing plate, wherein the backing plate includes a first surface and a second surface disposed oppositely to the first surface, and the first surface of the backing plate includes a first region and a second region surrounding the first region;
a plurality of light sources disposed on the first surface of the backing plate and arranged in an array, wherein the plurality of light sources includes a plurality of first light sources located in the first region and a plurality of second light sources located in the second region; and
a plurality of reflection structures, wherein each of the reflection structures is disposed at periphery of one of the second light sources, and reflects light emitted by the one of the second light sources to a side of the one of the second light sources facing away from the backing plate, while there is no reflection structure disposed at periphery of the first light sources in the first region, such that a luminous flux from the second region is increased to match a luminous flux from the first region,
wherein each of the reflection structures includes an inclined reflection surface having an angle with the first surface of the backing plate,
the inclined reflection surface has a tubular structure continuously disposed around periphery of the one of the second light sources,
the tubular structure includes a first end, a second end opposite to the first end, and a sidewall connecting the first end and the second end,
the first end of the tubular structure is located on the first surface of the backing plate, and the second end is located at a side of the backing plate where the plurality of light sources is disposed, and
an orthographic projection of the first end on the backing plate is within an orthographic projection of the second end on the backing plate.

2. The backlight module according to claim 1, wherein:
the first ends of all the tubular structures enclose a same area on the first surface, and all the tubular structures have a same sidewall length in a plane perpendicular to the first surface; and
in a direction from the first light sources to the second light sources, areas enclosed by the second ends of the tubular structures in a plane parallel to the first surface gradually decrease.

3. The backlight module according to claim 1, wherein:
the first ends of all the tubular structures enclose a same area on the first surface, and in a plane perpendicular to the first surface, the sidewalls of all the tubular structures have a same angle with the first surface; and in a direction from the first light sources to the second light sources, lengths of the tubular structures in a plane perpendicular to the first surface gradually increases.

4. The backlight module according to claim 1, wherein a shape enclosed by the first end on the first surface is same as a shape enclosed by the second end on the plane parallel to the first surface.

5. The backlight module according to claim 4, wherein the shape enclosed by the first end on the first surface and the shape enclosed by the second end on the plane parallel to the first surface are both circular or polygonal.

6. The backlight module according to claim 1, wherein a width of the second region in a direction from the first region to the second region is in a range of approximately 1 mm-5 mm.

7. The backlight module according to claim 1, wherein all the tubular structures have a same shape and a same size.

8. A backlight module, comprising:
a backing plate, wherein the backing plate includes a first surface and a second surface disposed oppositely to the first surface, and the first surface of the backing plate includes a first region and a second region surrounding the first region;
a plurality of light sources disposed on the first surface of the backing plate and arranged in an array, wherein the plurality of light sources includes a plurality of first light sources located in the first region and a plurality of second light sources located in the second region; and
a plurality of reflection structures, wherein each of the reflection structures is disposed at periphery of one of the second light sources, and reflects light emitted by the one of the second light sources to a side of the one of the second light sources facing away from the backing plate, while there is no reflection structure disposed at periphery of the first light sources in the first region, such that a luminous flux from the second region is increased to match a luminous flux from the first region,
wherein each of the reflection structures includes an inclined reflection surface having an angle with the first surface of the backing plate;
the inclined reflection surface includes a plurality of separated sub-reflection surfaces; and
the plurality of sub-reflection surfaces is evenly distributed around one of the second light sources, and have a same angle with the first surface of the backing plate.

9. The backlight module according to claim 8, wherein:
all the sub-reflection surfaces have a same shape and a same size, and have a same angle with the first surface of the backing plate; and
along a direction from the first light sources to the second light sources, number of sub-reflection surfaces disposed around one of the second light sources gradually increases.

10. The backlight module according to claim 9, wherein a shape of the sub-reflection surfaces is an isosceles trapezoid, the upper base of the isosceles trapezoid is located at the first surface of the backing plate, and the lower base of the isosceles trapezoid is located at a side of the backing plate where the plurality of light sources is disposed.

11. The backlight module according to claim 9, wherein the sub-reflection surfaces are curved surfaces, and a plurality of the separated sub-reflection surfaces around one of the second light sources form a portion of a sidewall of a truncated cone.

12. The backlight module according to claim 1, wherein the light sources are Mini LED lights.

13. The backlight module according to claim 1, wherein the reflection structure and the backing plate are formed into one single piece.

14. The backlight module according to claim 13, wherein:
the reflection structures and the backing plate are formed into one single piece by injection molding;
the backing plate is made of a material including polyethylene terephthalate; and
the reflection structures are made of a material including polyethylene terephthalate doped with barium sulfate particles.

15. The backlight module according to claim 1, wherein the reflection structures are formed on the backing plate by a bonding or damascene process.

16. The backlight module according to claim 15, wherein one of the reflection structures includes compressed reflection layers including at least approximately 600 reflection layers.

17. A display device, comprising a liquid crystal display panel and a backlight module on the back of the liquid crystal display panel, wherein the backlight module includes:
a backing plate, wherein the backing plate includes a first surface and a second surface disposed oppositely to the first surface, and the first surface of the backing plate includes a first region and a second region surrounding the first region;
a plurality of light sources disposed on the first surface of the backing plate and arranged in an array, wherein the plurality of light sources includes a plurality of first light sources located in the first region and a plurality of second light sources located in the second region; and
a plurality of reflection structures, wherein each of the reflection structures is disposed at periphery of one of the second light sources, and reflects light emitted by the one of the second light sources to a side of the one of the second light sources facing away from the backing plate, while there is no reflection structure disposed at periphery of the first light sources in the first region, such that a luminous flux from the second region is increased to match a luminous flux from the first region,
wherein each of the reflection structures includes an inclined reflection surface having an angle with the first surface of the backing plate,
the inclined reflection surface has a tubular structure continuously disposed around periphery of the one of the second light sources,
the tubular structure includes a first end, a second end opposite to the first end, and a sidewall connecting the first end and the second end,
the first end of the tubular structure is located on the first surface of the backing plate, and the second end is located at a side of the backing plate where the plurality of light sources is disposed, and
an orthographic projection of the first end on the backing plate is within an orthographic projection of the second end on the backing plate.

* * * * *